INVENTORS
WILLIAM E. WORLEY
FRANCIS A. HEINZ JR.
BY
William N. Antonis
ATTORNEY

Figure 1:
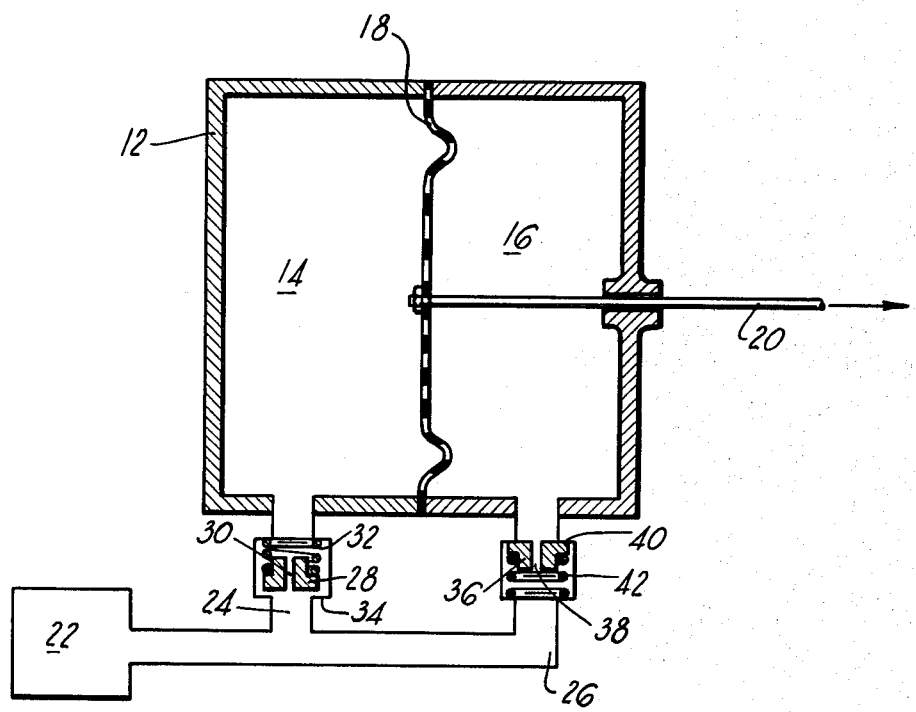
Figure 2:
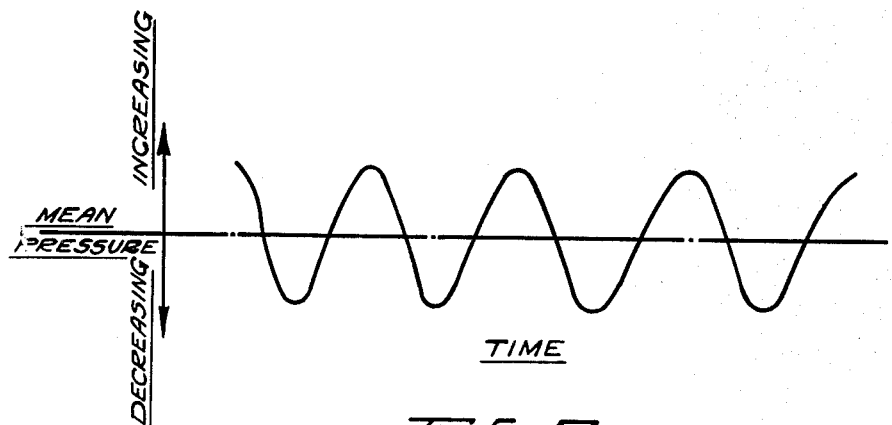

closed (as shown in FIGURE 1) during the increasing or high pressure portion of the pulsating pressure cycle shown in FIGURE 2. With check valve 28 being unseated and permitting unrestricted communication between the fluid pressure source and subchamber 14 during the high pressure portion of the pulsating pressure cycle, the pressure in subchamber 14 will rise to a value which is higher than the mean pressure of the pulsating pressure cycle. Conversely, during the decreasing or low pressure portion of the pulsating pressure cycle shown in FIGURE 2, check valve 28 will be caused to move away from valve seat 40 because of the differential pressure acting thereacross, and check valve 28 will be in a seated or closed position. With check valve 36 in an open position which will permit unrestricted communication between the fluid pressure source and subchamber 16 during the low pressure portion of the pulsating pressure cycle, the pressure in subchamber 16 will decrease to a value which is lower than the mean pressure of the pulsating pressure cycle.

Thus, upon the occurrence of a pulsating pressure cycle, the pressure in subchamber 14 will be higher than the mean pressure and the pressure in subchamber 16 will be lower than the mean pressure. As a result the differential pressure occurring across diaphragm 18 will cause movement of the diaphragm 18 and the control rod 20 in the direction shown on the drawing. As previously state, this movement of the rod 20 can be utilized to indicate the existence of pulsating pressures or to actuate a mechanism which will stop the pulsating pressures or compensate for the existence of such pressures.

It will be noted that the restrictive orifices 30 and 38 which extend through check valves 28 and 36, respectively, permit the pressures in subchambers 14 and 16 to equalize when the pressure pulsations cease. Consequently, the device is not sensitive to steady state pressures.

Although this invention has been described in connection with a specific embodiment, it will be obvious to those skilled in the art that various changes may be made in the form, structure, and arrangement of parts without departing from the spirit of the invention. For example, a piston or bellows could be used in place of the diaphragm. Similarly, ball check or flapper type valves could be used in place of the valves shown on the drawing. Furthermore, the device can operate with only one check valve but will utilize less of the available force. Accordingly, we do not desire to be limited to the specific embodiment disclosed herein primarily for purposes of illustration, but instead desire protection falling within the scope of the appended claims.

Having thus described the various features of the invention what we claim as new and desire to secure by Letters Patent is:

1. A device for detecting pulsating pressures comprising a housing having a chamber therein, a movable diaphragm located in said chamber and dividing said chamber into first and second subchambers, a control rod operatively connected to said diaphragm and movable therewith, first passage means for connecting said first subchamber with a pneumatic pressure source, second passage means for connecting the second subchamber with the same pneumatic pressure source, a first spring loaded check valve located in said first passage means, said first check valve being arranged to open and permit increased communication between the pressure source and said first subchamber during the high pressure portion of a pulsating pressure cycle, a second spring loaded check valve located in said second passage means, said second check valve being arranged to open and permit increased communication between the pressure source and said second subchamber during the low pressure portion of a pulsating pressure cycle, and restricted passages located in each sures in the first and second subchambers during steady state pressure applications when pulsing pressures are not emanating from the pressure source.

2. A device for detecting pulsating pressures comprising a housing having a chamber therein, movable pressure responsive means disposed in said chamber, means operatively connected to said pressure responsive means and movable therewith, first passage means for connecting one side of said pressure responsive means with a pneumatic pressure source, second passage means for connecting the other side of said pressure responsive means with the same pressure source, first valve means located in said first passage means, said first valve means being arranged to open and permit increased communication between the pressure source and said one side of said pressure responsive means during the high pressure portion of a pulsating pressure cycle, second valve means located in said second passage means, said second valve means being arranged to open and permit increased commuication between the pressure source and said other side of said pressure responsive means during the low pressure portion of a pulsating pressure cycle, and restrictive orifice means located in each of said passage means for permitting equalization of pressures on each side of said pressure responsive means during steady state pressure applications when pulsing pressures are not emanating from the pressure source.

3. A device for detecting pulsating pressures comprising a housing having a chamber therein, movable pressure responsive means disposed in said chamber, means operatively connected to said pressure responsive means and movable therewith, passage means for connecting each side of said pressure responsive means with a pneumatic pressure source, first and second valve means located in said passage means, said first and second valve means being arranged to alternately open and permit unrestricted communication between the pressure source and each side of the pressure responsive means during high and low pressure portions of a pulsating pressure cycle, and restrictive orifices located in said first and second valve means for permitting equalization of pressures on each side of said pressure responsive means during steady state pressure applications.

4. A device for detecting pulsating pressures comprising a housing having a chamber therein, pressure responsive means located in said chamber and dividing said chamber into first and second subchambers, control means operatively connected to said pressure responsive means and movable therewith, passage means for connecting each of said subchambers with a pneumatic pressure source, valve means located in said passage means, said valve means being arranged to open and permit increased communication between the pressure source and one of said subchambers during the high pressure portion of a pulsating pressure cycle, and restrictive orifice means located in said passage means for permitting equalization of pressures in each subchamber during steady state pressure applications.

References Cited by the Examiner

UNITED STATES PATENTS 1,924,091   8/1933   Eisenhour _____ 181—0.5

LOUIS R. PRINCE, *Primary Examiner.*

DAVID SCHONBERG, *Examiner.*

D. O. WOODIEL, *Assistant Examiner.*